Feb. 1, 1949.    J. W. H. MILLER    2,460,761
UNFIRED BONDED CERAMIC ARTICLES
AND METHOD OF PRODUCING SAME
Filed Jan. 23, 1945

INVENTOR,
John W. H. Miller,
BY
J. Stuart Freeman,
Attorney.

Patented Feb. 1, 1949

2,460,761

UNITED STATES PATENT OFFICE 2,460,761

UNFIRED BONDED CERAMIC ARTICLES AND METHOD OF PRODUCING SAME

John W. H. Miller, Bala-Cynwyd, Pa.

Application January 23, 1945, Serial No. 574,151

7 Claims. (Cl. 25—156)

The object of the invention is to provide, not only an improved unburned refractory of the basic or neutral type and other ceramic products, but also an improved method of producing same.

Another and more specific object is to produce an improved chemical bond in an unburned ceramic article composed of magnesia alone, or a wide range of mixtures consisting of both magnesia (MgO) and refractory grades of chromite ore ($Cr_2O_3$), bricks and shapes of this type being widely used in metallurgical structures such as basic open hearth furnaces, or furnaces in the non-ferrous industries.

A further object is to provide an unburned brick or the like in which the grains are cemented together by such chemical compounds as sulphites, sulphates, chlorides, chlorates and/or one or more interacting complexes, together with a simple and economical method of producing the same.

Still another object is to provide a ceramic product of this character comprising neutral or basic ore, tempered with water and subjected to an extraneous gaseous medium, which reacts chemically with the tempering liquid to form a chemical bond between the grains of which the product is molded.

And a still further object is to provide an improved method of manufacture, wherein the chemical reaction is carried on in the preferred embodiment under positive gaseous pressure for such period that formation of the bond is completed without evaporation of the tempering liquid, and the product attains such a temperature from such chemical reaction that when the pressure is released the sensible heat within the product serves to evaporate said tempering liquid to dryness, either at atmosphereic pressure or accelerated by and within a partial vacuum.

Figure 1:
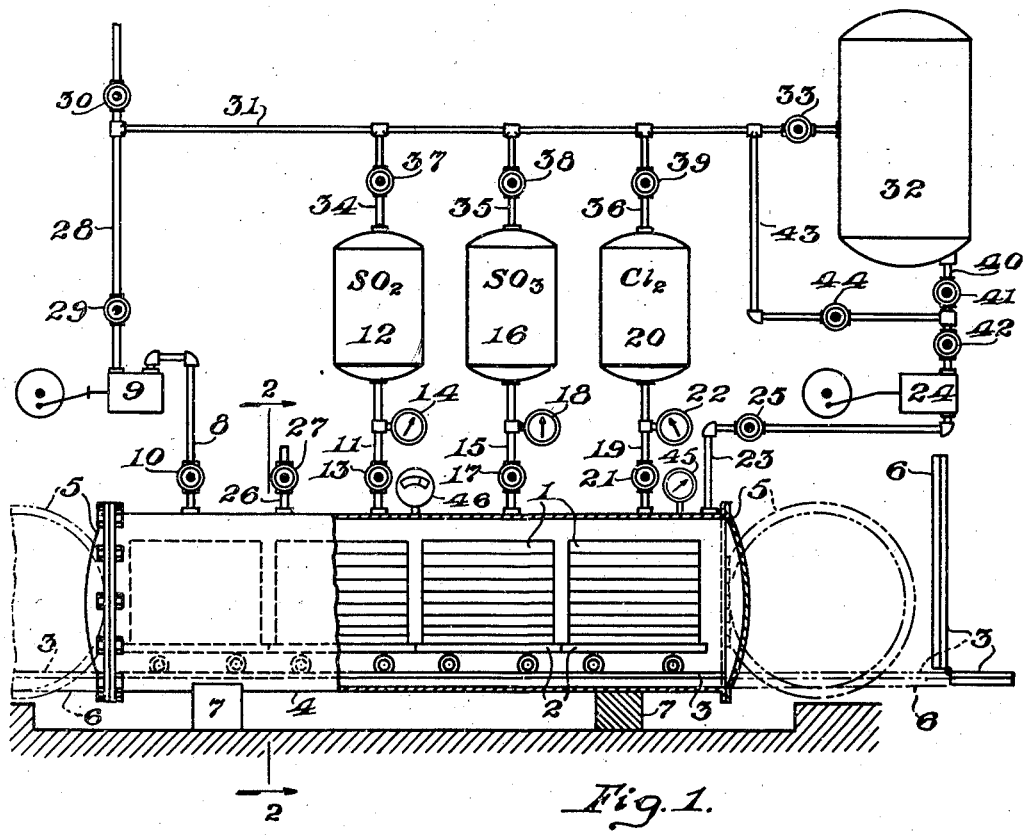
Figure 2:
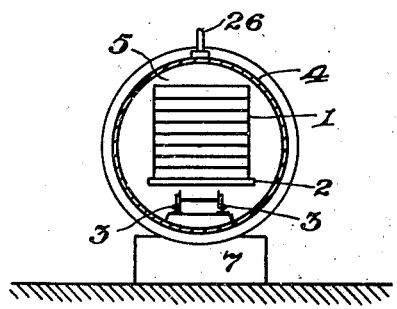

With the general objects thus broadly stated, the invention comprises further details which are hereinafter fully brought out in the following description, when read in conjunction with the accompanying drawing, in which Fig. 1 is a a schematic side elevation of an assembly of apparatus by which the improved method is carried out; and Fig. 2 is a transverse vertical section on the line 2—2 through the treating chamber shown in Fig. 1.

In the manufacture of basic brick and allied products from magnesia, or varying mixtures of magnesia and refractory grades of chromite ore, the raw material is initially prepared by well known grinding and screening methods to produce grains of a size suitable for providing desired characteristics in the finished product. The ground material is then tempered with water in any suitable mixing apparatus to produce a moisture content ranging from 4% to 7%, depending upon the analysis of the material and the pressures to be used in moulding. The next step is to feed the tempered material from the mixing apparatus to the moulding presses, where the prepared materials are briquetted into the desired shapes under pressures ranging from 3,000 to 10,000 pounds per square inch. The pressed brick or shapes are then dried in a heated drier and set in ceramic kilns, where they are fired to the desired degree. This produces the usual burned basic refractory products by the present day method.

The present invention differs from previous methods of forming unburned basic brick, in that only after the moulding step is completed is the brick subjected to a chemical media, which preferably under pressure reacts with the tempering liquid and the surfaces of the grains of the product to provide a homogeneous bond. The tempering liquid, water, when subjected to an extraneous gaseous medium, preferably under positive pressure, aids the reaction of the gaseous medium with the magnesia; to form a bond of such nature as magnesium sulphides, sulphites, chlorides, chlorates and related complexes.

The magnesia (MgO) herein referred to is a dead-burned product obtained by calcining natural ores of magesium carbonate ($MgCO_3$) to temperatures of 2900° to 3000° F., or from other suitable source. The natural ore contains impurities, so that a typical analysis will show varying amounts of iron, silica and lime as the principal impurities. Chromic-oxide content such as is used for refractory purposes differs from the metallurgical ores in that the chromic oxide is much lower, running from 28% to 45% $Cr_2O_3$. These raw materials are used separately or blended in varying proportions, depending upon the particular refractory qualities desired in the final product.

Referring to the drawings, there is here illustrated an arrangement of apparatus that is particularly adapted to carry out the improved method both economically and efficiently. It is understood in starting that the layers of bricks 1, shown upon dollies 2, have been previously formed in the usual manner, and that water has been used in tempering them, and that the dollies have been pushed or otherwise propelled upon rails 3 into a cylindrical chamber 4, one or both of the ends of which may be opened or closed and sealed at will, as by hingedly mounted closures 5. Those portions of the rails upon the outside of and adjacent to said chamber are carried upon supports 6, that may be swung or otherwise removed from the paths of the closures 5 when opened. The chamber itself may be mounted upon any suitable supports 7, and while preferably of cylindrical shape in order to better withstand both positive and negative internal pressures, may be of any other shape if preferred.

From any suitable points in the walls of said chamber lead pipes as follows: (1) 8 to one side of a vacuum pump 9 and having a valve 10; (2) 11 to a sulphur dioxide ($SO_2$) pressure tank 12 and having both a valve 13 and a pressure gauge or meter 14; (3) 15 to a sulphur trioxide ($SO_3$) pressure tank 16 and having both a valve 17 and a gauge or meter 18; (4) 19 to a chlorine ($Cl_2$) pressure tank 20 and having both a valve 21 and a gauge or meter 22; (5) 23 to a pressure pump 24 and having a valve 25; and (6) 26 having a valve 27 by which the seal of the chamber is broken to relieve a vacuum therein, or to permit the escape of air or other bases if the latter are not to be reused.

From the opposite end of the vacuum pump 9 leads a pipe 28 to the atmosphere, that is provided with spaced valves 29 and 30 between which this pipe is connected by another pipe 31 to a gas-storage tank 32, outside of which said last-mentioned pipe is provided with a valve 33. Between the pipe 28 and said storage tank, the pipe 31 is connected by pipes 34, 35 and 36, having valves 37, 38 and 39, respectively, to the respective pressure tanks 12 ($SO_2$), 16 ($SO_3$) and 20 (Cl). Said storage tank is also connected to said pressure pump by a pipe 40 having two spaced valves 41 and 42, between which a pipe 43 having a valve 44 connects said last-mentioned pipe 40 to the pipe 31 between the pipe 28 and the valve 33. Said chamber is also provided with a pressure gauge 45 and a temperature recorder 46, if desired.

In the operation of this apparatus and attendant method, it is assumed that a charge of pre-formed brick and/or other molded products have been loaded into the chamber 4, the ends 5 closed and sealed in any suitable manner, and that all of the valves shown are closed except valves 10, 29 and 30. The vacuum pump 9 is then used to exhaust as much of the air from the treating chamber as may be practicable, after which said valves 10, 29 and 30 are closed.

Depending upon which of the gases, sulphur dioxide, sulphur trioxide and/or chlorine are to be used in the chamber 4, one or more of the valves 37, 38 and 39, as well as the valves 44, 42 and 25 are opened, and the pump 24 is used to force the proper quantity of the one or more gases into said chamber, as indicated by the pressure gauges 14, 18 and 22, and to the desired pressure as indicated by the gauge 45, after which the valves 37, 38, 39, 44, 42 and 25 are closed.

The period of treatment may be regulated as a matter of time lapse, or as indicated by a suitable temperature indicator 46, as many of the possible chemical reactions produce an appreciable degree of heat. For example, the reaction of a sulphuric acid solution with magnesia may effect a rise of as much as 100° F., or thereabouts. Similarly, the absorption of sulphur trioxide ($SO_3$) by the moisture in the article to form sulphuric acid ($H_2SO_4$), and/or the absorption of some sulphur dioxide ($SO_2$) by the said moisture to form sulphurus acid ($H_2SO_3$), and in turn such acids reacting with the adjacent surfaces of the grains throughout the body of the refractory shapes create similarly high temperatures, which in time heat the shapes throughout their mass. Thus, when the chemical treatment is completed and the pressure sufficiently reduced, excess moisture in the bricks, shapes, or other products, may be evaporated by their latent heat. In pumping out the excess chemical gases for reuse, a vacuum is effected at which reduced pressure the boiling point of the liquid is well below the temperature of the shapes with resultant acceleration in drying.

When the period of treatment has ended, instead of releasing the pressure at once and thereby wasting unused or excess gas, the major portion of such single gas that may have been used may be returned to its particular pressure tank by means of the pump 9, by way of the opened valves 10 and 29, and the proper tank valve 37, 38 or 39. However, if a combination of such gases has been used and the excess is to be preserved for future reuse, it is pumped instead into the storage tank 32 by way of the combination of valves 10, 29 and 33. The pump 24 is required if relatively high pressures are required in the chamber 4, but if only such pressures are required therein as may be obtained by releasing the proper quantity of gas from one or more of the pressure storage tanks 12, 16 and 20, application of the proper gas or combination of gases may be effected merely by opening the proper valve or valves of the series 13, 17 and 21, and the quantity in such case determined by the gauges or meters 14, 18 and 22. The pipe 26 and its valve 27 are used for release of a vacuum or excess gas within the chamber whenever such may be desired, rather than as hereinbefore described.

In this method, the pressure employed determines the time required for treatment, and to a certain extent the efficiency of the bond, as well as preventing the brick or other shapes from drying before the desired degree of treatment has been fully effected. The treatment is completed when the contacting or adjacent surfaces of the grains have become cemented together through the formation of complex compounds of the sulphites, sulphates, chlorides, chlorates and interacting complexes of the various compounds with the magnesia, chromite ore, iron, silica and lime, and possibly other substances in the raw materials. Such a chemical bond provides a physically strong product having a markedly high crushing strength.

In view of the fact that the various chemical reactions generate heat, it is important that the pressure be controlled at such a level that the boiling point of the moisture content will be raised, and the moisture retained for the entire period of treatment, in order to thereby aid the chemical reactions to the fullest. It is also essential that the reactions be carried out at a speed that will produce such a degree of temperature in the brick, that at the end of the reaction, or at other predetermined point, the desired strength of the brick is assured, the preferred temperatures ranging approximately between 200° and 220° F. Furthermore, the speed of drying of the treated brick may be greatly accelerated by delaying the opening of the chamber following treatment of a charge, until the highest practical vacuum has been first effected therein, when the sensible heat of the shapes will rapidly evaporate the residual moisture, following which the vacuum is broken by opening the valve 27, the closure or closures opened and the shapes removed.

Additional advantages arising from practise of the improved method of bonding comprise minimizing the tendency to spall both at high and low temperatures, as well as preventing cracking and crumbling, as for instance upon the impingement of a molten metal bath, increased resistance to slags, rise in fusing temperature if in contact with basic material, increased homogeneity and resulting decrease in absorption. The improved bond fixes into an integral whole the finer particles of magnesia alone or in combination with chromite ore, which may be used in any desired proportion or ratio, but usually either magnesia 100% or a combination from approximately 85% magnesia to 15% chromite ore to approximately 15% magnesia to 85% chromite ore, depending upon the physical characteristics required in the finished product.

Having thus described my invention, what I claim and desire to protect by Letters Patent of the United States is:

1. The method of producing an unfired refractory article, which consists in preforming a body of granular refractory magnesia-containing material tempered with water, then subjecting said body to the chemically reactive effect of an extraneous gas selected from the group consisting of sulphur-dioxide, sulphur-trioxide and chlorine to bond the grains into a homogeneous mass.

2. The method of producing an unfired refractory article, which consists in preforming a body of magnesia and chromite ore tempered with water, then subjecting said body to the chemically reactive effect of an extraneous gas selected from the group consisting of sulphur-dioxide, sulphur-trioxide and chlorine to bend the grains into a homogeneous mass.

3. The method of producing an unfired refractory article, which consists in preforming a body of raw granular basic magnesia-containing material, tempered with water, subjecting the moist body to an acid-forming gas selected from the group consisting of sulphur-dioxide, sulphur-trioxide and chlorine under pressure, to form an integrally bonded mass and simultaneously heat said body, and then releasing the pressure to permit the heat of said body to evaporate its moisture content to dryness.

4. The method of producing an unfired refractory article, which consists in preforming a granular body of basic raw refractory magnesia-containing material tempered with water, then subjecting the moist body to a gas selected from the group consisting of sulphur-dioxide, sulphur-trioxide and chlorine under pressure to form an integral bond and simultaneously heat said body, and then releasing said pressure to permit the heat of said body to evaporate its moisture content.

5. The method of producing an unfired refractory article, which consists in preforming a body consisting of granular refractory magnesia material tempered with water, then subjecting said body to the chemically refractory magnesia material tempered with water, then subjecting said body to the chemically reactive effect of an extraneous gas selected from the group consisting of sulphur-dioxide, sulphur-trioxide and chlorine to bond the grains into a homogeneous mass.

6. An unfired refractory body produced by mixing refractory granular material with at least 8% magnesia, tempering the mixture with water, preforming the tempered mixture into the desired shape and thereafter bonding the preformed moist shape by subjecting it to an atmosphere of an extraneous gas selected from the group consisting of sulphur-dioxide, sulphur-trioxide and chlorine until the absorption of said gas substantially ceases.

7. An unfired refractory body produced by mixing granular chromite with at least 8% magnesia, tempering the mixture with water, preforming the tempered mixture into the desired shape and thereafter bonding the preformed moist shape by subjecting it to an atmosphere of an extraneous gas selected from the group consisting of sulphur-dioxide, sulphur-trioxide and chlorine until the absorption of said gas substantially ceases.

JOHN W. H. MILLER.

REFERENCES CITED

The following references are of record in the file of this patent:

UNITED STATES PATENTS

| Number | Name | Date |
| --- | --- | --- |
| 150,177 | Millen | Apr. 28, 1874 |
| 624,900 | Barber | May 16, 1899 |
| 629,567 | Imschenetzky | July 25, 1899 |
| 683,337 | Schulthess | Sept. 24, 1901 |
| 710,916 | Knox | Oct. 7, 1902 |
| 727,114 | Eaton | May 5, 1903 |
| 1,386,914 | Tufts | Aug. 9, 1921 |
| 1,572,714 | Frosell | Feb. 9, 1926 |
| 1,876,909 | Gelder | Sept. 13, 1932 |
| 2,188,921 | Richard | Feb. 6, 1940 |

FOREIGN PATENTS

| Number | Country | Date |
| --- | --- | --- |
| 17,640 | Great Britain | 1889 |